Patented Nov. 8, 1938

2,135,987

UNITED STATES PATENT OFFICE 2,135,987

INSECTICIDE COMPOSITION

Donald F. Murphy, Bristol, Pa., assignor to Röhm & Haas Company, Philadelphia, Pa.

No Drawing. Application July 25, 1935,
Serial No. 33,060

7 Claims. (Cl. 167—24)

This invention relates to improvements in contact insecticides and more particularly to improvements of solutions of contact insecticides in anhydrous organic solvents. It is known that dispersing or emulsifying agents when present in aqueous dispersions of contact insecticides greatly enhance their killing power, probably because of the better spreading and wetting properties of such aqueous emulsions.

The object of this invention is to provide a method of increasing the killing power of contact insecticides, such as pyrethrum, derris, rotenone, organic thiocyanates etc. when used in non-aqueous solutions.

It has been found that the addition of anhydrous dispersing agents to the anhydrous organic solutions of contact insecticides brings about a decided increase in their effectiveness. For instance, the fly sprays at present on the market are for the greater part solutions of the insecticidal principle, such as derris cube, pyrethrum, organic thiocyanates, etc., in kerosene or similar petroleum distillate. If substances which lower the surface or interfacial tension of these solutions are added thereto, their ability to spread more rapidly over the surface of the leaves and petals of plants and over the bodies of insects is greatly increased. Due to this increased spreading or wetting ability the power of penetration into the body of insects, etc., is also increased resulting in greater effectiveness and therefore the addition of anhydrous dispersing agents is of great economic advantage. The fact that these anhydrous dispersing agents in the anhydrous organic solvents would markedly increase the speed of penetration of the insecticidal principle into the insect's body and thus increase its effectiveness was not known before the present invention.

This invention is applicable to solutions made from pyrethrum flowers, derris or cube roots or compounds of the rotenone group as well as to mixtures of any of these contact poisons. It is also applicable to solutions of organic thiocyano compounds containing one or more thiocyano groups and to mixtures of such compounds with any of the foregoing natural insect poisons.

Various types of organic thiocyano compounds may be used of which the following are examples:

Simple esters of thiocyanic acid include n-butyl; tertiary butyl; n-amyl; isoamyl; tertiary amyl; octyl; secondary octyl; lauryl; cetyl; cyclohexyl; α,α,γ,γ-tetramethylbutylcyclohexyl; phenyl; benzyl and esters of the monoalkyl ethers of ethylene glycol such as the methyl; ethyl; propyl; butyl etc.

Esters of β-thiocyanoethyl alcohol and aliphatic carboxylic acids such as lauric; acetic etc.

Esters of thiocyanocarboxylic acids such as methyl; ethyl; amyl; lauryl; β-ethoxyethyl etc. esters of thiocyanoacetic acid; butyl; amyl; secondary octyl; cyclohexyl; β-ethoxyethyl etc. esters of β-thiocyanopropionic acid; diethyl thiocyanomalonate.

Dithiocyano compounds such as dithiocyanoethylene; dithiocyano styrene etc.

Acetals such as α(β-thiocyanoethoxy)-α-(β'-chloroethoxy)-β-methylproprane; α,α,bis(β-thiocyanoethoxy)ethane; α,α,bis(β - thiocyanoethoxy)propane; α,α,bis(β - thiocyanoethoxy)heptane; bis(β-thiocyanoethoxy)methane; α,α,bis-(β-thiocyanoethoxy)butane; α,α,bis(β-thiocyanoethoxy)butane-2; α,α,bis(β-thiocyanoethoxy)-γ-thiocyanopropane; α,α,bis(β - thiocyanoethoxy) - β - methylpropane; bis(γ - thiocyanopropoxy) - methane; α,α,bis(γ-thiocyanopropoxy)-β-methylpropane.

Bis(β-thiocyanoethoxyethyl) esters of dibasic acids such as succinic, sebacic etc.

Ethers containing thiocyano groups in various positions such as β-thiocyanoethyl-ethyl ether; β - thiocyanoethylbutyl ether; β - thiocyano - β' - butoxydiethyl ether; β-thiocyano-β'-isobutoxydiethyl ether; β-thiocyano-β'-ethoxydiethyl ether; β - thiocyano - β' - phenoxydiethyl ether; β-thiocyano - β' - (p - chlorophenoxy)diethyl ether; β-thiocyano - β' - (o-chlorophenoxy)diethyl ether; β-thiocyano-β' - (p-nitrophenoxy)diethyl ether; β-thiocyano - β' - (α,α,γ,γ-tetramethylbutylphenoxy)diethyl ether; β-thiocyano-β'-cresoxydiethyl ether and also ethers of the types β-thiocyano-β'-formoxydiethyl ether; β-thiocyano-β'-acetoxydiethyl ether; β-thiocyano-β'-(ethoxyacetoxy)-diethyl ether; β-thiocyano-β'-butyroxydiethyl ether; β-thiocyano-β'-isobutyroxydiethyl ether; β - thiocyano - β' - benzoxydiethyl ether; β-thiocyano-β'-naphthenoxydiethyl ether; β-thiocyano - β' - furoxydiethyl ether; bis(β - thiocyano - ethyl)ether, etc.

Aromatic thiocyano compounds such as p-thiocyano aniline; p-thiocyano toluidine; p-thiocyanodimethylaniline; p-thiocyanoanisidine; p-thiocyanobenzylaniline; thiocyano - 2,4,dinitro - benzene; thiocyanoacetophenone; thiocyano-α-naphthol; thiocyano-α-naphthylamine; p-thiocyanophenylmorpholine; dithiocyanodiphenylamine, etc.

Various thiocyano compounds such as thiocyano acetone and other thiocyano ketones; 2,3-bis- (β-thiocyanoethoxy)dioxane; bis(β-thiocyanoethyl)sulfoxide; α,β,bis(β-thiocyanoethoxy-methoxy)ethane; α,γ-dithiocyanoacetone; α,γ-dithiocyanopropanol-2; bis(β-thiocyanoethoxy)phenyl methane; tris(β-thiocyanoethyl)amine; bis(β-thiocyanoethyl) sulfide.

The anhydrous organic solvents which may be used depend on the nature of the insect poison and include, for example, kerosene and other petroleum distillates, the monoalkyl ethers of ethylene glycol and of diethylene glycol, benzene, ethylene dichloride and mixtures of these.

Many types of anhydrous dispersing agents may also be used including anhydrous sulfated and sulfonated oils and their anhydrous salts, anhydrous alkali metal soaps, soaps having an organic base such as triethanolamine oleate, etc., or triethanolamine salts of the monoalkylsulfuric acid esters, etc., and also the anhydrous sulfates of quaternary ammonium bases obtained by condensing a phenol, formaldehyde and a non-aromatic secondary amine and treating the tertiary amine thus formed with an alkyl sulfuric acid, and the salts obtainable by neutralizing these tertiary amines with a long chain, fatty acid.

To illustrate this invention more clearly, the following examples are given:

Example 1

4 cc. of a pyrethrum extract which contained the equivalent of 20 lbs. of pyrethrum flowers to the gallon of kerosene were dissolved in 96 cc. of kerosene. By a series of Peet-Grady tests (Jour. Econ. Entomology 21, 598 (1928)) the killing power of this solution was shown to be, on an average, 58%. When 1% of anhydrous sulfonated castor oil was added to this same kerosene solution and again a series of Peet-Grady tests on flies was run, the average kill was 64%.

Example 2

If 1% of triethanolamine oleate is substituted for the sulfonated castor oil in the pyrethrum-kerosene solution shown in Example 1, the kill is increased to 65%.

Example 3

5 g. of 20:1 pyrethrum extract and 0.025 g. crystalline rotenone are dissolved in 95 cc. of kerosene. This mixture shows a Peet-Grady kill of 68%. When this solution is shaken with triethanolamine lauryl sulfate until saturated with it, the Peet-Grady kill is increased to 74%.

Example 4

A 2% solution of the triocyanate of the monobutyl ether of diethylene glycol in kerosene gave a kill of 75% in the Peet-Grady test, but after saturating this solution with triethanolamine lauryl sulfate the kill was increased to an average of 81%.

Example 5

One and one-half cc. of the thiocyanate of the monobutyl ether of diethylene glycol were dissolved in 98.5 cc. of amyl alcohol. Another solution of the same strength was made but 2% of anhydrous sulfonated castor oil was added. These solutions were tested by atomizing them into separate spaces of about 3 cu. ft. at an atomizing air pressure of about 25 lbs. By this procedure each space was filled with a mist of the insecticide. Sprigs of apple trees, which were infested with Aphis pomi, were exposed to the atomized mist for 3 minutes in each case. After 25 hours the dead and live Aphis were counted. The average kill for the solution without the sulfonated castor oil was 68% whereas solutions containing the sulfonated castor oil gave an average of 72%. There was no injury to the apple leaves in either case.

Example 6

1.5% of the thiocyanate of the monobutyl ether of diethylene glycol was dissolved in 98.5% of the monobutyl ether of ethylene glycol. This solution was divided into two parts, and to one part was added 3% of triethanolamine oleate. These two solutions were sprayed into the same chambers and under the same conditions as described in Example 5. In each case stalks of carnations infested with red spider were exposed to the vapors for 5 minutes. The counts after 25 hours showed an average of 17% dead without the triethanolamine oleate and of 27% with the triethanolamine oleate.

Example 7

A 1.5% solution of the thiocyanate of the monobutyl ether of diethylene glycol in methyl isobutyl ketone was prepared. To part of this solution 2% of triethanolamine lauryl sulfate was added. The two solutions were then tested side by side on flies by the Peet-Grady method. The average kill of the solution without the dispersing agent was 65% and with the dispersing agent 83%.

Example 8

A solution of 1.25% of the thiocyanate of the monobutyl ether of diethylene glycol and 5% of derris extractives was made in kerosene, and in one-half of this mixture 2% of anhydrous sulfonated castor oil was incorporated. Both solutions were then tested by the Peet-Grady method. The solution without the sulfonated oil gave an average kill of 74% and the solution with the sulfonated castor oil gave an average kill of 78%, again showing the increase due to the small amount of the anhydrous dispersing agent.

Example 9

A 3% solution of the thiocyanate of the monobutyl ether of diethylene glycol was made in kerosene; then a solution of 1.5% Ivory soap chips in amyl alcohol was made. One part of the first solution was mixed with one part of the second solution and this mixture was tested. Then another mixture was made containing equal parts of solution #1 and amyl alcohol. On testing, the one containing no soap gave an average Peet-Grady kill of 57% and the one containing Ivory soap gave an average kill of 64%.

I claim:

1. A non-aqueous insect spray that is a dilute solution of at least one insect poison and an anhydrous wetting agent in an anhydrous organic liquid selected from the group consisting of kerosene and other petroleum distillates, the monoalkyl ethers of ethylene and diethylene glycol, benzene, and ethylene dichloride.

2. A non-aqueous insect spray that is a dilute solution of a member of the group consisting of pyrethrum, derris, cube root and other rotenone containing substances in an anhydrous organic liquid that is a member of the group consisting of kerosene and other petroleum distillates, the monoalkyl ethers of ethylene and diethylene glycol, benzene, and ethylene dichloride, said insect spray also containing an anhydrous wetting agent.

3. A non-aqueous insect spray that is a dilute solution of an organic thiocyanate compound, an anhydrous wetting agent, and a naturally occurring insect poison selected from the group consisting of pyrethrum, derris, cube root, and other rotenone containing substances in an organic liquid that is a member of the group consisting of kerosene and other petroleum distillates, the monoalkyl ethers of ethylene and diethylene glycol, benzene, and ethylene dichloride.

4. A non-aqueous insect spray that is a dilute solution of an organic thiocyano compound and an anhydrous wetting agent in an anhydrous organic liquid selected from the group consisting of kerosene and other petroleum distillates, the monoalkyl ethers of ethylene and diethylene glycol, benzene, and ethylene dichloride.

5. An insect spray as claimed in claim 1 in which the anhydrous wetting agent is triethanolamine lauryl sulphate.

6. An insect spray as claimed in claim 3 in which the anhydrous wetting agent is triethanolamine lauryl sulphate.

7. A non-aqueous insect spray that is a dilute solution of an extract of pyrethrum, rotenone, and triethanolamine lauryl sulphate in an anhydrous organic liquid selected from the group consisting of kerosene and other petroleum distillates, the monoalkyl ethers of ethylene and diethylene glycol, benzene, and ethylene dichloride.

DONALD F. MURPHY.